(12) United States Patent
Taga et al.

(10) Patent No.: US 11,245,468 B2
(45) Date of Patent: Feb. 8, 2022

(54) MEASUREMENT APPARATUS OF OPTICAL COMMUNICATION SYSTEM

(71) Applicant: KDDI CORPORATION, Tokyo (JP)

(72) Inventors: Hidenori Taga, Fujimino (JP);
Takehiro Tsuritani, Fujimino (JP);
Hidenori Takahashi, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 17/103,450

(22) Filed: Nov. 24, 2020

(65) Prior Publication Data

US 2021/0105067 A1    Apr. 8, 2021

Related U.S. Application Data

(63) Continuation of application No. PCT/JP2019/027930, filed on Jul. 16, 2019.

(30) Foreign Application Priority Data

Aug. 17, 2018  (JP) .................................. 2018-153370
Feb. 18, 2019  (JP) ............................. JP2019-026482

(51) Int. Cl.
*H04B 10/077*    (2013.01)
*H04B 10/07*     (2013.01)
*H04B 10/079*    (2013.01)

(52) U.S. Cl.
CPC ......... *H04B 10/0775* (2013.01); *H04B 10/07* (2013.01); *H04B 10/0795* (2013.01); *H04B 10/07955* (2013.01)

(58) Field of Classification Search
None
See application file for complete search history.

(56) References Cited

U.S. PATENT DOCUMENTS 6,339,495 B1 *   1/2002   Cowle ................. H04B 10/296
                                                    359/337.1
6,999,230 B2     2/2006   Uda
(Continued)

FOREIGN PATENT DOCUMENTS

EP    0 849 893 A2    6/1998
JP    2003-166904 A    6/2003
(Continued)

OTHER PUBLICATIONS

P. Poggiolini, et. al., "The GN-Model of Fiber Non-Linear Propagation and its Applications", Journal of Lightwave Technology, vol. 32, No. 4, Feb. 15, 2014, pp. 694-721.
(Continued)

*Primary Examiner* — Darren E Wolf
(74) *Attorney, Agent, or Firm* — Foley & Lardner LLP

(57) ABSTRACT

A measurement apparatus includes: a light source unit configured to generate optical signals of, from among n+1 frequencies (n is an integer of 3 or larger) at a predetermined frequency interval, n frequencies except for a target frequency, and output the generated optical signals to an optical transmission path that is a measurement target; an optical power measurement device configured to measure of an optical signal of the target frequency output from the optical transmission path and generated in the optical transmission path as a result of four-wave-mixing of the optical signals of the n frequencies; and a processor configured to determine a power spectrum density of non-linear interference noise that occurs in the optical transmission path, by multiplying the power of the optical signal of the target frequency by an adjustment value.

15 Claims, 7 Drawing Sheets

(56) References Cited

U.S. PATENT DOCUMENTS

| | | | |
|---|---|---|---|
| 2002/0048062 A1* | 4/2002 | Sakamoto | H04B 10/2569 398/30 |
| 2003/0026527 A1 | 2/2003 | Takahashi et al. | |
| 2003/0137653 A1 | 7/2003 | Kawabata | |
| 2010/0322622 A1 | 12/2010 | Shukunami | |
| 2016/0157075 A1* | 6/2016 | Ho | H04W 4/90 455/404.2 |
| 2016/0373187 A1 | 12/2016 | Oda | |
| 2018/0054793 A1* | 2/2018 | Renaldi | H04W 64/00 |
| 2019/0148904 A1* | 5/2019 | Tanaka | H01S 3/0085 359/341.3 |

FOREIGN PATENT DOCUMENTS

| | | |
|---|---|---|
| JP | 2003-234701 A | 8/2003 |
| JP | 2008-041928 A | 2/2008 |
| JP | 2011-024189 A | 2/2011 |
| JP | 2017-011506 A | 1/2017 |

OTHER PUBLICATIONS

Mateo, et. al., "Capacity Limits of Submarine Cables", Emerging Subsea Networks, SubOptic 2016, Paper Th1A.1, 2016.

Poggiolini, Pierluigi, "The GN Model of Non-Linear Propagation in Uncompensated Coherent Optical Systems", Journal of Lightwave Technology, vol. 30, Issue 24, IEEE, Dec. 2012, pp. 3857-3879.

Inoue, "Experimental Study On Channel Crosstalk Due To Fiber Four-Wave Mixing Around the Zero-Dispersion Wavelength", Journal of Lightwave Technology, IEEE, vol. 12, No. 6, Jun. 1994, pp. 1023-1028, XP000484221, ISSN: 0733-8724, DOI: 10.1109/50.296194.

Extended European Search Report issued in corresponding European Patent Application No. 19850466.4 dated Sep. 20, 2021.

* cited by examiner

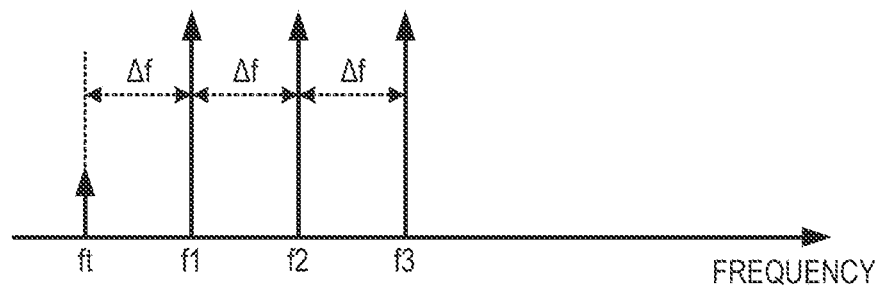
FIG. 2A
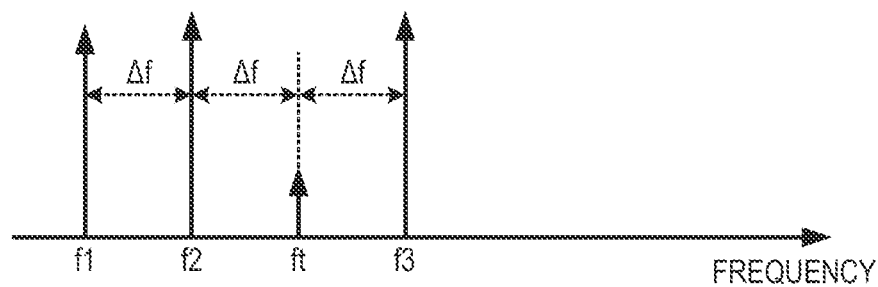
FIG. 2B
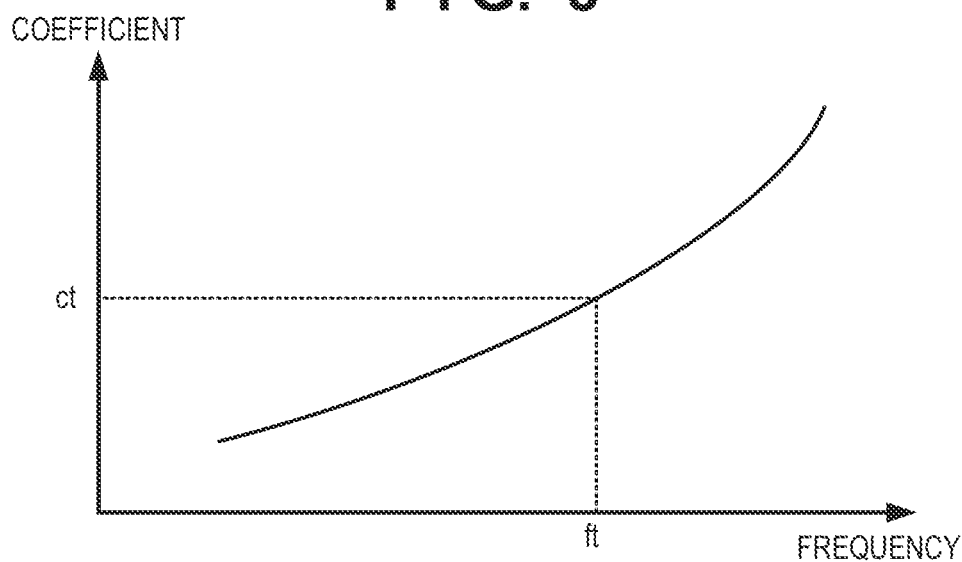
FIG. 3
FIG. 4

F I G. 10
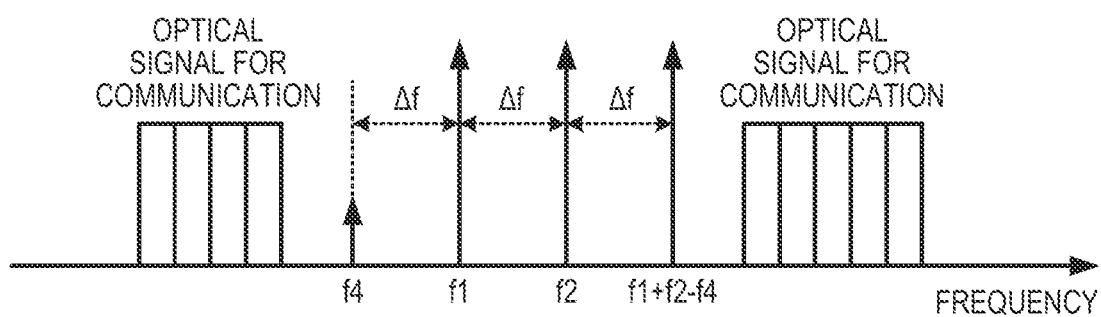

MEASUREMENT APPARATUS OF OPTICAL COMMUNICATION SYSTEM

CROSS-REFERENCE TO RELATED APPLICATION(S)

This application is a continuation of International Patent Application No. PCT/JP2019/027930 filed on Jul. 16, 2019, which claims priority to and the benefit of Japanese Patent Application Nos. 2018-153370 filed on Aug. 17, 2018, and 2019-026482 filed on Feb. 18, 2019, the entire disclosures of which are incorporated herein by reference.

BACKGROUND OF THE INVENTION

Field of the Invention

The present invention relates to a technique for measuring the quality of an optical communication system, and in particular relates to a technique for measuring the generalized optical signal-to-noise ratio (G-OSNR) of an optical communication system.

Description of the Related Art

In optical communication systems, an optical amplifier causes optical noise. Therefore, an optical signal-to-noise ratio (OSNR) has been used as a parameter for evaluating the qualities of the optical communication systems. In addition, in each optical communication system, the quality of an optical signal deteriorates due to the linear optical characteristics and non-linear optical characteristics of the system. Note that various techniques for electrically compensating for the linear optical characteristics represented by wavelength dispersion have been established by now, and the linear optical characteristics is no longer a main factor for deteriorating the performances of optical communication systems. On the other hand, no effective compensation technique has been established for the non-linear optical characteristics such as self-phase modulation, which has still been a main factor for deteriorating the performances of optical communication systems.

NPL 1 discloses quantifying, as non-linear interference noise, deterioration of the quality of an optical signal due to the non-linear optical characteristics. In addition, NPL 2 proposes a generalized optical signal-to-noise ratio (G-OSNR), which is a quality evaluation parameter of an optical communication system in which optical noise and quantified non-linear interference noise are taken into consideration. Specifically, when the power of an optical signal, the power of optical noise, and the power of non-linear interference noise are respectively denoted by $P_{CH}$, $P_{ASE}$, and $P_{NL}$, G-OSNR is obtained based on $P_{CH}/(P_{ASE}+P_{NL})$.

CITATION LIST

Patent Literature

NPL 1: P. Poggiolini, et. al., "The GN-Model of Fiber Non-Linear Propagation and its Applications", JLT-32, no. 4, pp. 694-721, Feb. 15, 2014

NPL 2: Mateo, et. al., SubOptic 2016, Paper Th1A.1, 2016

SUMMARY OF THE INVENTION

NPL 1 proposes to obtain a non-linear interference noise amount using a calculation formula called GNRF (Gaussian Noise Reference Formula). Note that, specifically, NPL 1 discloses theoretically obtaining a power spectrum density $G_{NLI}(f)$ of non-linear interference noise at a frequency f by performing very complicate calculation of dual integration based on various parameters of an optical communication system, and the like. However, NPL 1 does not disclose a specific method for measuring the power spectrum density $G_{NLI}(f)$ of the non-linear interference noise.

The present disclosure provides a measurement apparatus that can measure the power spectrum density of non-linear interference noise.

According to one aspect of the present invention, a measurement apparatus includes: a light source unit configured to generate optical signals of, from among n+1 frequencies (n is an integer of 3 or larger) at a predetermined frequency interval, n frequencies except for a target frequency, and output the generated optical signals to an optical transmission path that is a measurement target; an optical power measurement device configured to measure of an optical signal of the target frequency output from the optical transmission path and generated in the optical transmission path as a result of four-wave-mixing of the optical signals of the n frequencies; and a processor configured to determine a power spectrum density of non-linear interference noise that occurs in the optical transmission path, by multiplying the power of the optical signal of the target frequency by an adjustment value.

Other features and advantages of the present invention will be apparent from the following description taken in conjunction with the accompanying drawings. Note that the same reference numerals denote the same or like components throughout the accompanying drawings.

BRIEF DESCRIPTION OF THE DRAWINGS

FIG. 2A is a diagram showing the relationship between frequencies of optical signals that are output by a measurement apparatus according to an embodiment.

FIG. 2B is a diagram showing the relationship between frequencies of optical signals that are output by a measurement apparatus according to an embodiment.

FIG. 3 is a diagram showing coefficient information according to an embodiment.

FIG. 4 is a diagram showing a model for generating coefficient information according to an embodiment.

FIG. 10 is a diagram showing a mode of measurement according to an embodiment of the present invention.

DESCRIPTION OF THE EMBODIMENTS

Figure 1:
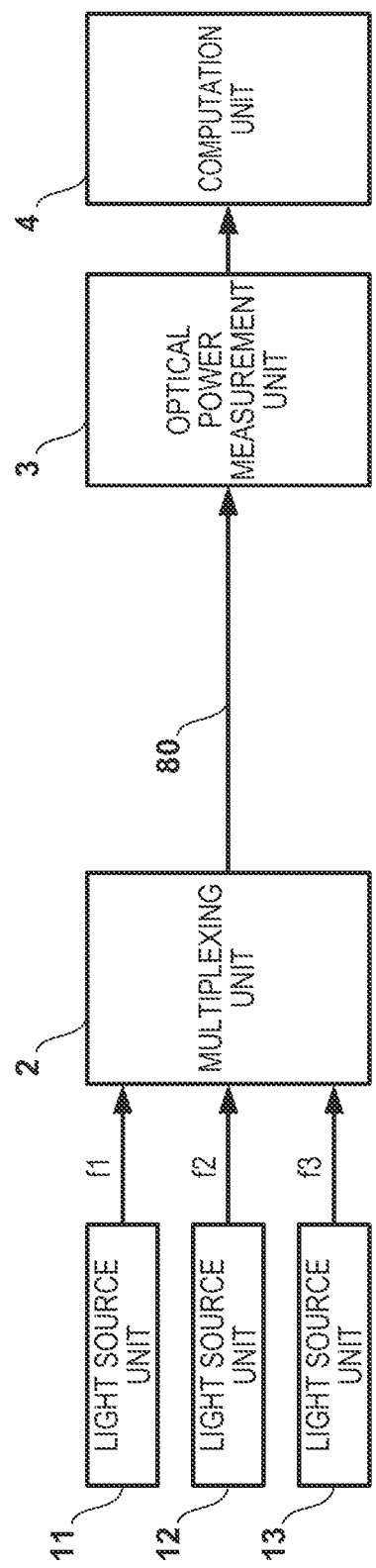
FIG. 1 is a diagram showing a configuration of a measurement apparatus according to an embodiment.

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

The present inventors have found that, in GNRF of NPL 1 for obtaining $G_{NLI}(f)$, a portion for obtaining an absolute value is equivalent to the power of an optical signal of a frequency f generated as a result of non-degeneration four-wave-mixing of three frequencies f1, f2 and f3. Accordingly, it has been found that the power spectrum density of non-linear interference noise can be obtained by measuring the power of the optical signal of the frequency f generated as a result of non-degeneration four-wave-mixing, and multiplying the measured power by an appropriate adjustment value, and the present invention has been achieved.

First Embodiment

FIG. 1 is a diagram showing a configuration of a measurement apparatus according to this embodiment. The measurement apparatus includes three light source units 11 to 13, a multiplexing unit (multiplexer) 2, an optical power measurement unit (an optical power measurement device) 3, and a computation unit 4 including one or more processors and one or more memory devices, and measures a power spectrum density of non-linear interference noise of an optical communication system (optical transmission path) 80. In addition, it is possible to adopt a configuration in which a non-linear interference noise amount is obtained based on the measured power spectrum density of non-linear interference noise, and G-OSNR is further obtained.

The light source unit 11 generates an optical signal of a frequency f1, and outputs the signal to the multiplexing unit 2, the light source unit 12 generates an optical signal of a frequency f2, and outputs the signal to the multiplexing unit 2, and the light source unit 13 generates an optical signal of a frequency f3, and outputs the signal to a multiplexer 3. Note that, in order to generate an optical signal of a frequency ft as a result of four-wave-mixing, it is desirable that the light source units 11 to 13 are configured to generate optical signals for which the polarized wave state changes over time. For example, a configuration can be adopted in which a plurality of light sources for generating mutually incoherent optical signals are provided in each of the light source units 11 to 13. In this case, the light source units 11 to 13 can generate optical signals in which the polarized wave state changes over time, by combining optical signals generated by the plurality of light sources. In addition, a configuration can also be adopted in which the light source units 11 to 13 are provided with a single light source and a polarized wave scrambler that changes, over time, the polarized wave state of an optical signal generated and output by the single light source. The multiplexing unit 2 performs frequency multiplexing (wavelength multiplexing) of optical signals of the frequencies f1, f2 and f3, and outputs the optical signals to the optical communication system 80 that is a measurement target.

Here, in the optical communication system 80, an optical signal of the frequency ft is generated as a result of four-wave-mixing of the three optical signals of the frequencies f1, f2 and f3. According to this embodiment, the frequencies f1, f2 and f3 are set such that, when the four optical signals of the frequencies f1, f2, f3 and ft are aligned on the frequency axis, all of the intervals between two adjacent optical signals are Δf. Note that the four frequencies f1, f2, f3 and ft may have any magnitude relationship. FIGS. 2A and 2B show examples of a frequency arrangement.

In FIG. 2A, an arrangement is adopted in which the frequency ft is the lowest, the frequency f1 is the second lowest, the frequency f2 is the second highest, and the frequency f3 is the highest. On the other hand, in FIG. 2B, an arrangement is adopted in which the frequency f1 is the lowest, the frequency f2 is the second lowest, the frequency ft is the second highest, and the frequency f3 is the highest. Note that there are a large number of frequency arrangements that can be adopted, in addition to the frequency arrangements shown in FIGS. 2A and 2B.

The optical power measurement unit 3 measures the power of the optical signal of the frequency ft generated as a result of four-wave-mixing, and outputs the measured power to the computation unit 4. Note that, when a polarized wave is changed on the transmission side by the polarized wave scrambler, a period during which the power of the optical signal of the frequency ft is measured is longer than the cycle of the change in the polarized wave on the transmission side. The computation unit 4 stores coefficient information indicating the correspondence relation between frequency and coefficient, for example, as shown in FIG. 3. The computation unit 4 determines a coefficient ct of the frequency ft based on the coefficient information, and uses the coefficient ct as an adjustment value. The computation unit 4 then obtains $G_{NLI}(ft)$ by multiplying the adjustment value by the power of the optical signal of the frequency ft measured by the optical power measurement unit 3. How to obtain coefficient information that is stored in the computation unit 4 in advance will be described below.

First, as shown in FIG. 4, a model of an optical communication system that has the same number of spans as the optical communication system 80, which is a measurement target, is defined. Note that one span refers to a section from immediately after a certain optical amplification portion to the next optical amplification portion. In this example, the number of spans of the optical communication system 80 is five, and thus the number of spans of the model shown in FIG. 4 is also five. Note that, in FIG. 4, the length of each span (span length) is 80 km.

First, regarding the defined model, $G_{NLI}(f)$ for each frequency f is obtained by performing calculation using GNRF disclosed in NPL 1. In addition, the power of an optical signal that is generated as a result of four-wave-mixing in the defined model is also obtained by performing calculation for each frequency f, based on a theoretical formula for obtaining power of an optical signal generated as a result of four-wave-mixing. Coefficient information can then be generated by dividing $G_{NLI}$ obtained through calculation by the power of the optical signal generated as a result of four-wave-mixing, for each frequency f.

As described above, according to this embodiment, coefficient information indicating the correspondence relation between frequency and coefficient is calculated in advance based on a model that has the same number of spans as the optical communication system 80 that is a measurement target, and is stored in the computation unit 4. The computation unit 4 can then measure $G_{NLI}(ft)$ in a simple manner by multiplying the power of the optical signal of the frequency ft generated as a result of four-wave-mixing and measured by the optical power measurement unit 3 by an adjustment value that is based on the coefficient ct of the frequency ft determined based on the coefficient information. A non-linear interference noise amount can then be measured by measuring $G_{NLI}(ft)$ while changing the frequency ft over a bandwidth that is used by the optical communication system 80 that is a measurement target. In addition, G-OSNR can be measured by measuring the power of optical noise and the power of an optical signal in parallel. Note that, when the value of a coefficient in the coefficient information does not change very much in accordance with a frequency, a non-linear interference noise amount can be measured in a simple manner by multiplying $G_{NLI}(ft)$ by a bandwidth that is used by the optical communication system 80 that is a measurement target.

The measurement apparatus according to this embodiment generates optical signals of the frequencies f1, f2 and f3, and measures power of an optical signal of the frequency ft generated as a result of four-wave-mixing. Therefore, even if there is an optical signal of another frequency than the frequencies of these four optical signals, the measurement is not affected. FIG. 10 shows this state. FIG. 10 shows a state where measurement is performed using a blank bandwidth of an optical signal (optical signal for communication) that is used for actual communication. In this manner, the measurement apparatus according to this embodiment can perform measurement in not only an optical communication system that is not used for providing a communication service, but also an optical communication system that is used for providing a communication service. In other words, the measurement apparatus according to this embodiment can perform both in-service measurement and out-of-service measurement.

Second Embodiment

Figure 5A:
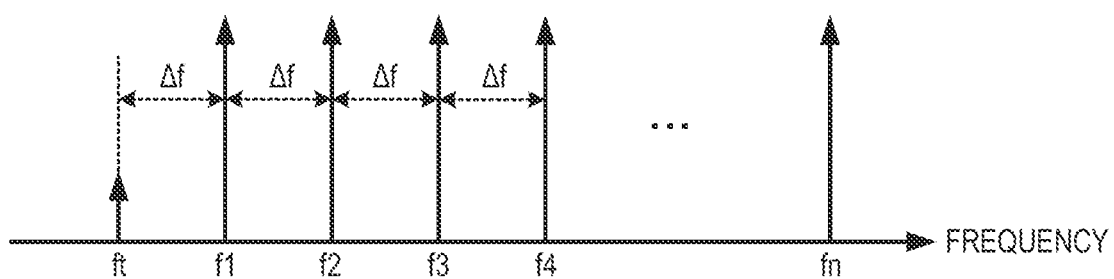
FIG. 5A is a diagram showing the relationship between frequencies of optical signals that are output by a measurement apparatus according to an embodiment.
Figure 5B:
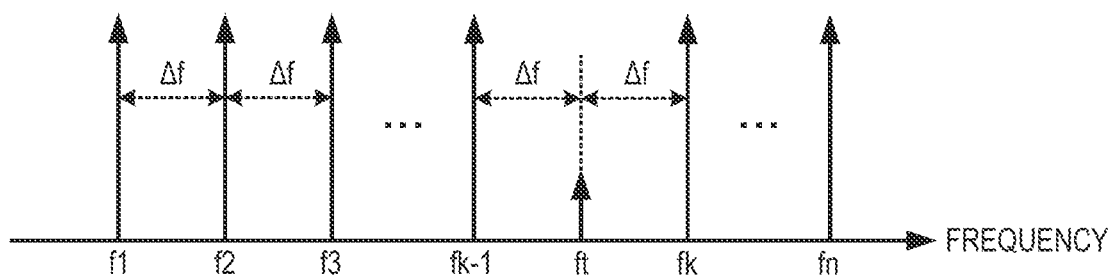
FIG. 5B is a diagram showing the relationship between frequencies of optical signals that are output by a measurement apparatus according to an embodiment.

Next, a second embodiment will be described with a focus on differences from the first embodiment. According to the first embodiment, the power of the optical signal of the frequency ft generated as a result of four-wave-mixing of the three optical signals of the frequencies f1, f2 and f3 is measured. According to this embodiment, power of an optical signal of the frequency ft generated as a result of four-wave-mixing of n optical signals of frequencies f1 to fn is measured. Note that, according to this embodiment, n is an integer of four or larger. In addition, a frequency fk (k is an integer of 2 to n) is a frequency higher than a frequency fk−1. FIGS. 5A and 5B show examples of the relationship between the frequency ft used for measurement and the frequencies f1 to fn. In FIG. 5A, the frequency ft is lower than the frequency f1. In FIG. 5B, the frequency ft is a frequency between the frequency fk−1 and the frequency fk. Note that the number of optical signals (k−1) of frequencies lower than the frequency ft and the number of optical signals (n−k+1) of frequencies higher than the frequency ft may be the same or different. In addition, although not illustrated, the frequency ft can be a frequency higher than the frequency fn. In any case, an arrangement is adopted in which, when the frequencies f1 to fn and ft are aligned on the frequency axis, the frequency intervals Δf of two adjacent frequencies are the same. As being made clear based on FIGS. 5A and 5B, the first embodiment is achieved by setting n=3 in this embodiment.

Figure 6A:
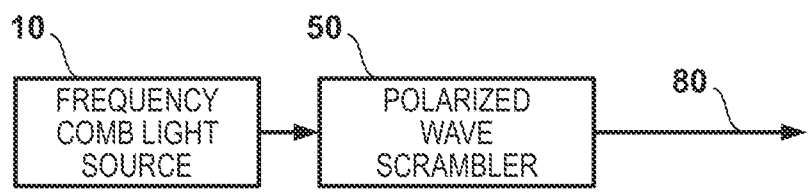
FIG. 6A is a diagram showing a configuration on the transmission side of a measurement apparatus according to an embodiment.
Figure 6B:
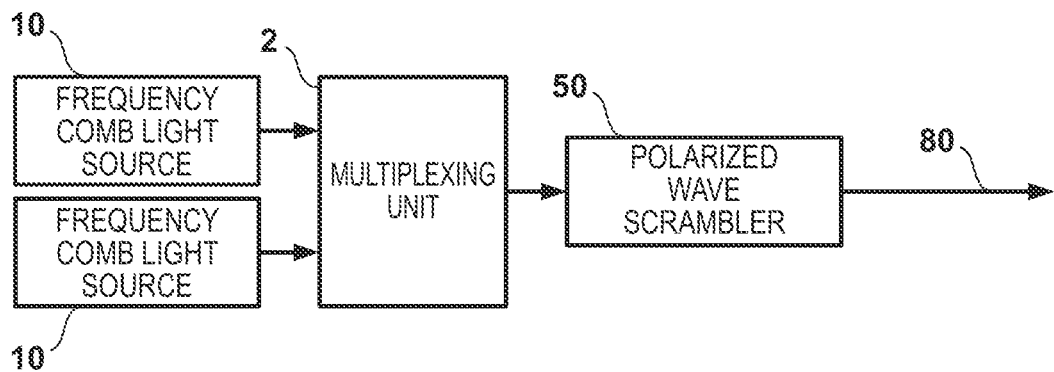
FIG. 6B is a diagram showing a configuration on the transmission side of a measurement apparatus according to an embodiment.
Figure 6C:
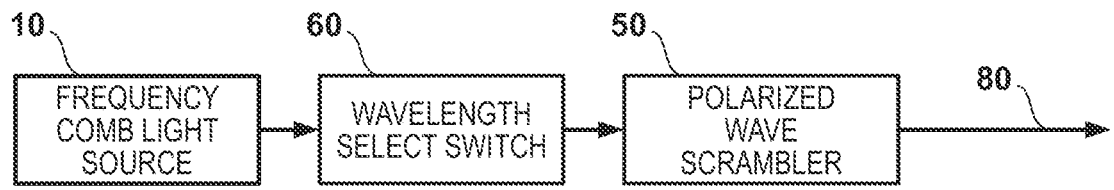
FIG. 6C is a diagram showing a configuration on the transmission side of a measurement apparatus according to an embodiment.

FIGS. 6A to 6C are diagrams showing configurations on the transmission side of the measurement apparatus according to this embodiment. A frequency comb light source 10 is a light source that generates a plurality of optical signals (continuous light) at the predetermined frequency interval Δf, and light sources that can generate about 1000 optical signals are in practical use. The configuration in FIG. 6A can be applied when an arrangement is adopted in which the frequency ft is lower than the frequency f1 (FIG. 5A) or higher than the frequency fn. In this case, the frequency comb light source 10 generates optical signals of the frequencies f1 to fn, and outputs the n generated optical signals to a polarized wave scrambler 50. The polarized wave scrambler 50 changes the polarized waves of the optical signals of the frequencies f1 to fn over time. Note that the reason for providing the polarized wave scrambler 50 is the same as that in the first embodiment. FIG. 6B shows a configuration that can be applied when an arrangement is adopted in which the frequency ft is between the frequency fk−1 and the frequency fk (FIG. 5B). In this case, one frequency comb light source 10 generates optical signals of the frequencies f1 to fk−1, and outputs the generated optical signals to the multiplexing unit 2. The other frequency comb light source 10 generates optical signals of the frequency fk to fn, and outputs the generated optical signals to the multiplexing unit (multiplexer) 2. The multiplexing unit 2 combines the n optical signals in total from the two frequency comb light sources 10, and outputs the resultant to the polarized wave scrambler 50. FIG. 6C shows a configuration that can be applied to any frequency arrangement. In this case, the frequency comb light source 10 generates (n+1) optical signals in total at the predetermined frequency interval Δf, and outputs the (n+1) generated optical signals to a wavelength select switch (WSS) 60. The wavelength select switch 60 suppresses the optical signal corresponding to the frequency ft, and outputs the n remaining optical signals to the polarized wave scrambler 50. Note that the configuration and processing on the receiving side of the measurement apparatus are similar to those in the first embodiment.

Figure 7:
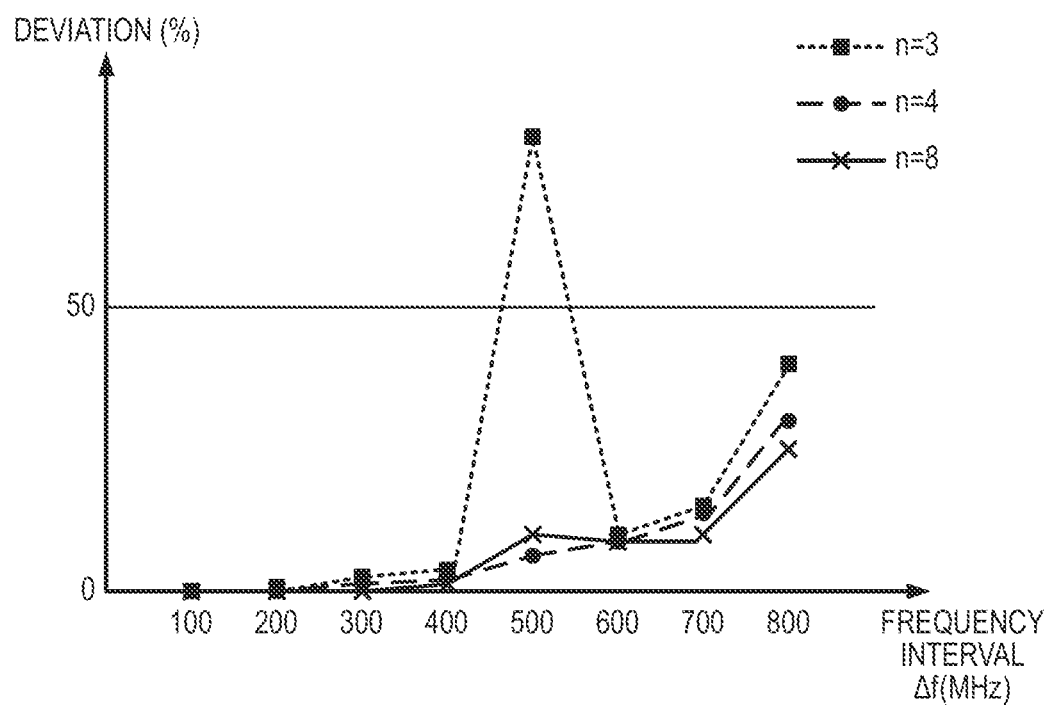
FIG. 7 is a diagram showing an example of the relationship between a frequency interval Δf and deviation of power of an optical signal of a frequency ft.

Next, the reason for n=4 or larger will be described. FIG. 7 shows power of the optical signal of the frequency ft actually measured after transmission of the optical communication system 80 of 20 spans at 1600 km (80 km/span) while changing the frequency interval Δf. Note that the vertical axis indicates deviation (%) from a calculated value. As in the first embodiment, if n=3, deviation is small when the frequency interval Δf is up to about 400 MHz, but deviation is large about when the frequency interval Δ exceeds 400 MHz. FIG. 7 shows a case where n=4 and also a case where n=8. If n=4 and n=8, deviation increases about when the frequency interval Δf=700 MHz is exceeded.

Figure 8:
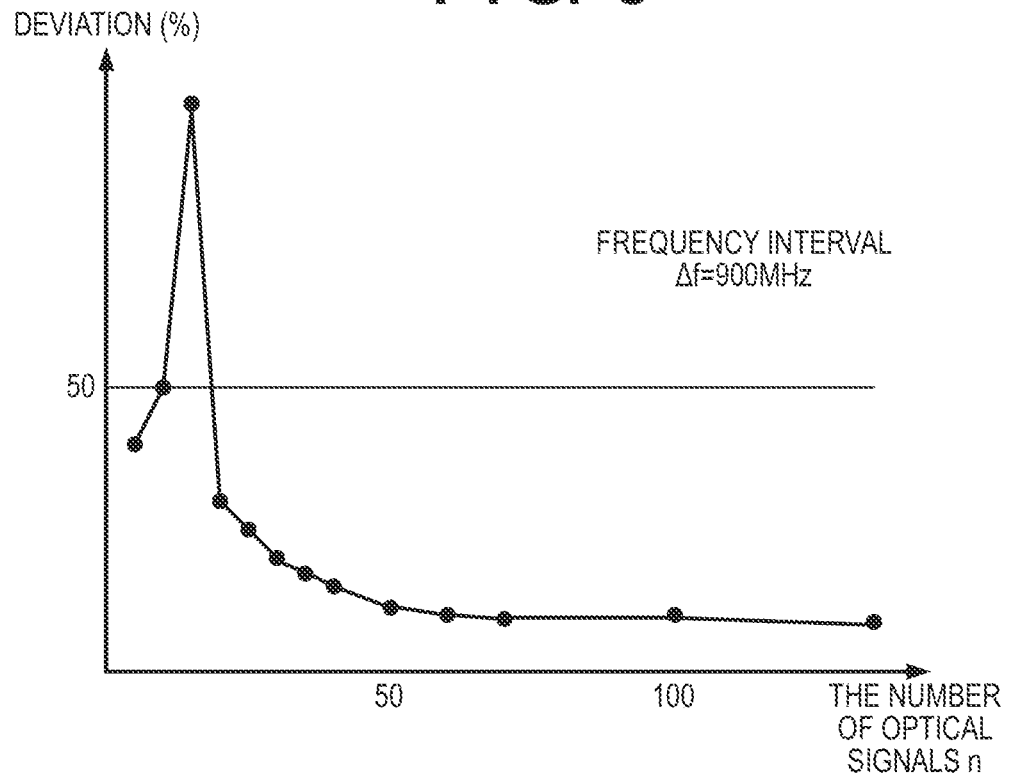
FIG. 8 is a diagram showing an example of the relationship between the number of optical signals n and the deviation of the power of the optical signal of the frequency ft.

FIG. 8 shows deviation of an actual measured value of power of the optical signal of the frequency ft when the frequency interval Δf is fixed at 900 MHz, and the number of optical signals n is changed. In FIG. 8, if the number of optical signals n=50 or larger, a change in the power of the optical signal of the frequency ft is sufficiently small. Furthermore, if the number of optical signals n=100 or larger, a change in the power of the optical signal of the frequency ft becomes smaller. In this manner, if the number of optical signals for generating an optical signal at the position of the frequency ft is small, the difference between an actual measurement value of the power of the optical signal of the frequency ft generated as a result of four-wave-mixing and an ideal value used when a coefficient shown in FIG. 3 was obtained is made larger, by increasing the frequency interval Δf. This leads to an error of $G_{NLI}$(ft).

Here, if the frequency interval Δf can be made sufficiently small, $G_{NLI}$(ft) can be accurately measured even if n=3 as described in the first embodiment. However, there are cases where, depending on the frequency stability of an optical signal generated by a light source, it is not possible to secure the frequency interval Δf for accurately measuring $G_{NLI}$(ft) when n=3. In addition, the longer the distance of the optical communication system 80 is, the larger the acceptable minimum value of the frequency interval Δf becomes. In other words, depending on a light source that is used and the optical communication system 80 that is a measurement target, it may be impossible to accurately measure $G_{NLI}$(ft) if n=3. For example, although not illustrated, in the optical communication system 80 of 100 spans at 8000 km (80 km/span), if n=3, deviation increases about when 100 MHz is exceeded. In other words, in the optical communication system 80 of 100 spans at 8000 km (80 km/span), if n=3, measurement needs to be performed at a frequency resolution smaller than 100 MHz, but this is virtually impossible.

Thus, according to this embodiment, n is set to four or larger, 50 or larger, or 100 or larger. It is possible to increase the number of combinations of optical signals for generating an optical signal at the position of the frequency ft as a result of four-wave-mixing, by increasing n. For example, in the arrangement in FIG. 5A, an optical signal is generated at the position of the frequency ft based on each combination of optical signals of f1, fm and fm+1 (m is an integer from 2 to n−1). Accordingly, even if the frequency interval Δf is increased, it is possible to decrease the difference between actually measured power of the optical signal of the frequency ft and power of an optical signal used for calculating a coefficient in FIG. 3, and, thus, $G_{NLI}$(ft) can be accurately measured.

Third Embodiment

Next, a third embodiment will be described with a focus on differences from the first embodiment. According to the first embodiment, for example, if the power of the optical signal of the frequency ft generated as a result of four-wave-mixing is weak, and is at an optical noise level or lower, the optical power measurement unit 3 cannot measure the power of the optical signal of the frequency ft generated as a result of four-wave-mixing. According to this embodiment, even if the power of the optical signal of the frequency ft generated as a result of four-wave-mixing cannot be directly measured by the optical power measurement unit 3, it is made possible to measure $G_{NLI}$(ft).

Figure 9:
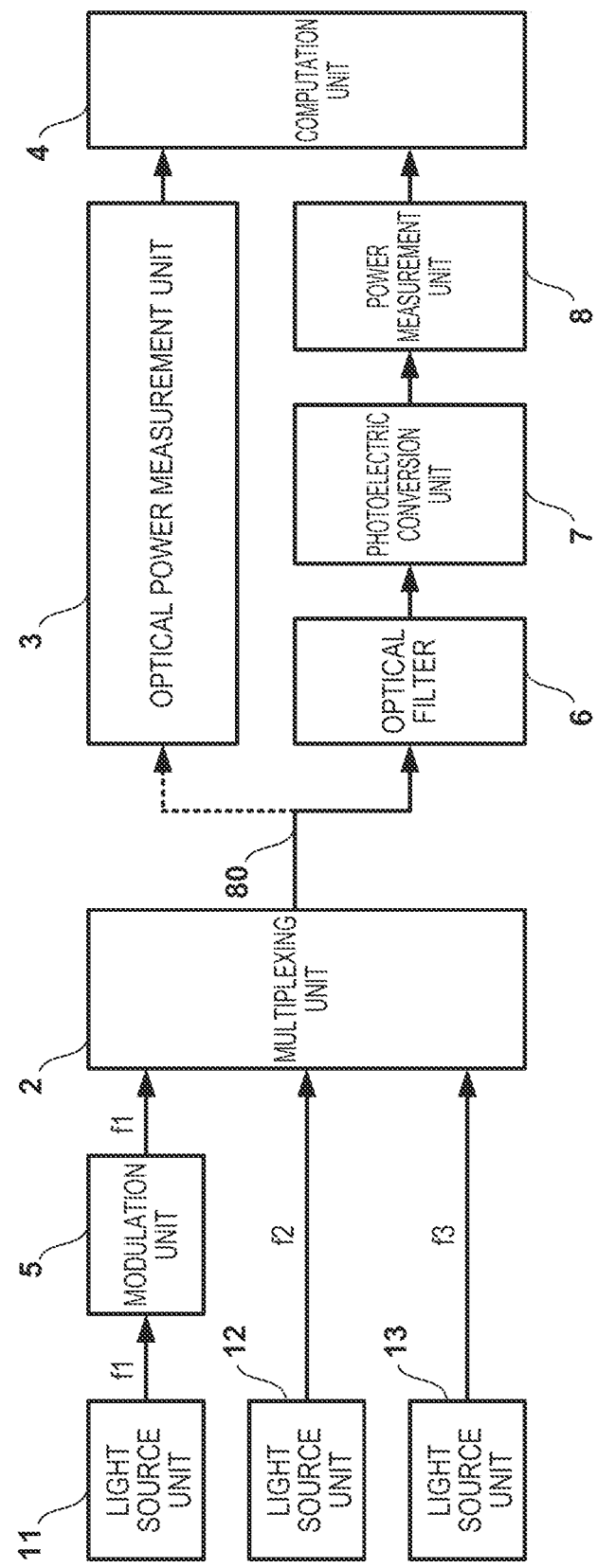
FIG. 9 is a diagram showing a configuration of a measurement apparatus according to an embodiment.

FIG. 9 is a diagram showing a configuration of a measurement apparatus according to this embodiment. Note that the same reference numerals are used for the same constituent elements as those of the configuration in FIG. 1, and a description thereof is omitted. According to this embodiment, any one optical signal out of three optical signals that are output by the three light source units 11 to 13 is modulated into modulated light using predetermined data such as random data, and the other optical signals are kept as continuous light. Note that any modulation method may be used. In this example, an optical signal of the frequency f1 that is output by the light source unit 11 is modulated, and, for this reason, a modulation unit (modulator) 5 is provided between the light source unit 11 and the multiplexing unit 2.

In the optical communication system 80, an optical signal of the frequency ft is generated as a result of four-wave-mixing of three optical signals of the frequencies f1 to f3, but, due to the frequency f1 being a frequency of modulated light, the optical signal of the frequency ft also becomes modulated light. Output of the optical communication system 80 is first connected to the optical power measurement unit 3. The optical power measurement unit (optical power merriment device) 3 measures power P1 of the modulated light of the frequency f1. Subsequently, output of the optical communication system 80 is connected to an optical filter 6. The optical filter 6 is a variable filter capable of changing a passband. The optical filter 6 is first set so as to transmit the modulated light of the frequency f1. Therefore, a photoelectric conversion unit (photoelectric converter) 7, which may be a photodiode, outputs a first modulation electrical signal based on the modulated light of the frequency f1, and a power measurement unit (electric power measurement device) 8 measures power E1 of the first modulation electrical signal. Subsequently, the optical filter 6 is set so as to transmit the modulated light of the frequency ft. Therefore, the photoelectric conversion unit 7 outputs a second modulation electrical signal based on the modulated light of the frequency ft, and the power measurement unit 8 measures power Et of the second modulation electrical signal. Note that the power measurement unit 8 can measure the power Et of the second modulation electrical signal since optical noise is random and does not appear in output of the photoelectric conversion unit 7. The power measurement unit 8 outputs the power E1 and the power Et of the two measured modulation electrical signals to the computation unit 4.

Here, when the power of the modulated light of the frequency ft is denoted by Pt, the ratio of the power Pt to the power P1 of the modulated light of the frequency f1 (Pt/P1) is equal to the ratio of the power Et of the second modulation electrical signal that is based on the modulated light of the frequency ft to the power E1 of the first modulation electrical signal that is based on the modulated light of the frequency f1 (Et/E1). Therefore, the computation unit 4 can obtain the power Pt of the optical signal of the frequency ft generated as a result of four-wave-mixing, based on Pt=P1× Et/E1. Then, the computation unit 4 can obtain $G_{NLI}$(ft) by multiplying the obtained power Pt by an adjustment value determined based on coefficient information, similarly to the first embodiment.

With the above-described configuration, even if the power of the optical signal of the frequency ft generated as a result of four-wave-mixing cannot be directly measured due to optical noise, $G_{NLI}$(ft) can be obtained.

Fourth Embodiment

Next, a fourth embodiment will be described with a focus on differences from the first and second embodiments. In the first and second embodiments, coefficient information is generated based on a model that has the same number of spans as that of the optical communication system 80 that is a measurement target. Therefore, in order to perform measurement in optical communication systems of various numbers of spans, it is necessary to generate pieces of coefficient information based on models of various numbers of spans, and select a piece of coefficient information to be used, according to the number of spans of an optical communication system that is a measurement target. In this embodiment, a configuration will be described in which only coefficient information generated based on a single model of a predetermined number of spans is stored in the computation unit 4, and the coefficient information is corrected according to the number of spans of the optical communication system 80 to be measured, and is used.

First, for example, coefficient information that is based on a model of five spans shown in FIG. 3 and GNRF described in NPL1 for obtaining $G_{NLI}(f)$ are stored in the computation unit 4. In addition, the number of spans of the optical communication system 80, which is a measurement target, is set in the computation unit 4.

The computation unit 4 calculates a rate of $G_{NLI}(ft)$ when a model of five spans is used to $G_{NLI}(ft)$ for the number of spans of the optical communication system 80 that is a measurement target, as a number-of-span correction value, based on GNRF. The computation unit 4 then obtains an adjustment value for the frequency ft for the number of spans of the optical communication system 80 by multiplying the coefficient ct determined based on the coefficient information by the number-of-span correction value, and obtains $G_{NLI}(ft)$ by multiplying the adjustment value by the power of the optical signal of the frequency ft generated as a result of four-wave-mixing.

For example, in order to calculate coefficient information for a certain model, it is required to calculate $G_{NLI}(f)$ based on GNRF for each frequency f, in other words, using a frequency f as a variable, and the calculation amount is huge. In other words, a huge amount of calculation needs to be performed in order to generate coefficient information for each of the models of a plurality of numbers of spans.

According to this embodiment, one piece of coefficient information is generated in advance, and only a number-of-span correction value for the frequency ft that is a measurement target is obtained using GNRF. Specifically, instead of performing calculation using GNRF for each of a plurality of frequencies f, only calculation for obtaining a rate of one number of spans to the other number of spans (the other parameters are the same) is performed for only a predetermined frequency ft. Therefore, the calculation amount for obtaining a number-of-span correction value is not large.

With the above-described configuration, $G_{NLI}(ft)$ can be measured using one piece of coefficient information, in optical communication systems of various numbers of spans.

Fifth Embodiment

In the first and second embodiments, $G_{NLI}(ft)$ is measured using coefficient information obtained based on a model of the same number of spans as the optical communication system 80 that is a measurement target, and, according to the fourth embodiment, a description has been given on a configuration for when the optical communication system 80 of the number of spans different from that of a model used for generating coefficient information is measured. Here, as shown in FIG. 4, in a model that is used for generating the coefficient information, in order to simplify the calculation, the same parameters (span length, wavelength dispersion, and dispersion slope) are set for the spans. However, even if the number of spans of the model is the same as that of the optical communication system 80 that is a measurement target, the span lengths, wavelength dispersions, and dispersion slopes of the spans are not necessarily the same in the optical communication system 80 that is a measurement target. A configuration will be described below in which $G_{NLI}(ft)$ is obtained accurately compared with the first to fourth embodiments.

Span Length

The present inventors have found, through study and research, that variation in the span lengths of spans of an optical communication system does not affect a measurement result, and only the average value of the span lengths of the spans of the optical communication system affects a measurement result. Therefore, $G_{NLI}(ft)$ can be accurately measured by generating pieces of coefficient information respectively corresponding to a plurality of average values of span lengths, and selecting and using a piece of coefficient information corresponding to an average value that is the closest to the average value of the span lengths of the optical communication system 80 that is a measurement target. Alternatively, a configuration can also be adopted in which, in addition to coefficient information obtained for a model in which the lengths of the spans are the same (in FIGS. 5A and 5B, 80 km), span length correction information indicating the relationship between the average value of span lengths and a span length correction value for correcting the coefficient information is stored in the computation unit 4. In this case, the computation unit 4 corrects a coefficient determined based on the coefficient information, using the span length correction value determined using the span length correction information, obtains an adjustment value, and determines $G_{NLI}(ft)$ using this adjustment value.

Wavelength Dispersion

The present inventors have found, through study and research, that, similar to span lengths, if the dispersion of the entire optical communication system is the same as the dispersion of a model, the wavelength dispersion in spans (value per unit distance) does not affect a measurement result as well. Therefore, similarly to the above-described span lengths, $G_{NLI}(ft)$ can be obtained more accurately by storing, in the computation unit 4, pieces of coefficient information corresponding to a plurality of dispersions, and using a piece of coefficient information corresponding to a dispersion that is the closest to the dispersion of the optical communication system that is a measurement target. In addition, similar to span lengths, a configuration can be adopted in which a coefficient obtained based on one piece of coefficient information is corrected based on the dispersion of the optical communication system that is a measurement target, and is used. In this case, dispersion correction information indicating the relationship between dispersion and a dispersion correction value for correcting the coefficient is generated in advance, and is stored in the computation unit 4.

Dispersion Slope

The present inventors have found, through study and research, that, regarding dispersion slopes (values per unit distance), variation in the dispersion slopes of spans affects a measurement result in addition to the average value. Therefore, $G_{NLI}(ft)$ can be obtained more accurately by adopting a configuration in which coefficient information that is based on a combination of the value of a dispersion slope of a measurement target and the standard deviation (or dispersion) is generated in advance. Alternatively, a configuration can also be adopted in which dispersion slope correction information indicating the relationship between a dispersion slope correction value and the combination of the value of a dispersion slope and the standard deviation (or dispersion) is obtained in advance, and is stored in the computation unit 4. In this case, the computation unit 4 can more accurately determine $G_{NLI}(ft)$ by obtaining a dispersion slope correction value based on the dispersion slope of the entire optical communication system 80 that is a measurement target and the standard deviation (or dispersion) of the dispersion slope of each span, correcting a coefficient using the obtained dispersion slope correction value, and obtaining an adjustment value.

Note that correction of a coefficient based on span lengths, wavelength dispersion, and dispersion slopes, or use of coefficient information in accordance with span lengths, wavelength dispersion, and dispersion slopes can be used in combination.

Sixth Embodiment

In the first to fifth embodiments, it is envisioned that the gain profile (relationship between frequency and gain) of the optical communication system 80 that is a measurement target is flat. In a normal wavelength multiplexing optical communication system, an equalizer that suppresses a change in the gain of each wavelength is used, and this envision is appropriate in general. However, if the gain profile of the optical communication system 80 that is a measurement target is not flat, a measurement result differs according to the frequency ft.

Here, when $G_{NLI}$ is measured while changing the frequency ft over a bandwidth that is used in the optical communication system 80 that is a measurement target, a non-linear interference noise amount is obtained based on an actual measurement value, and thus there is no problem, but, when a non-linear interference noise amount is obtained in a simple manner by multiplying $G_{NLI}$ measured for one frequency, namely the frequency ft by a bandwidth that is used in the optical communication system 80 that is a measurement target, a measurement result changes in accordance with the value of the frequency ft.

Thus, if the gain profile of the optical communication system 80 that is a measurement target is not flat, an error of a measured value can be suppressed by setting the frequency ft to a frequency at which the value of the gain is the average gain value in a signal bandwidth or is within a predetermined range that includes the average value. Note that the higher the gain is, the more the value of $G_{NLI}$ increases, and the more G-OSNR deteriorates, and thus, a frequency at which the gain is the highest can be the frequency ft in order to determine the most undesirable value.

Other Embodiments

In addition, a measurement apparatus according to the present invention can be realized by programs for causing a computer to operate/function as the above measurement apparatus. These computer programs include an instruction for causing a computer to operate/function as the above measurement apparatus, when executed by one or more processors of the computer. Further, the operations/functions of the computation unit 4 in each embodiments may be realized by one or more processors executing programs. The programs executable by the one or more processors to realize the computation unit 4 are stored in one or more memory devices in the above measurement apparatus. In addition, a non-transitory computer-readable storage medium that stores the computer programs is provided.

The present invention is not limited to the above embodiments and various changes and modifications can be made within the spirit and scope of the present invention. Therefore, to apprise the public of the scope of the present invention, the following claims are made.

What is claimed is:

1. A measurement apparatus comprising:
a light source configured to generate optical signals of n frequencies, n is an integer of 3 or larger, from among n+1 frequencies at a predetermined frequency interval, and output the generated optical signals to an optical transmission path that is a measurement target, wherein one frequency that is different from the n frequencies out of the n+1 frequencies is a target frequency;
an optical power meter configured to measure power of an optical signal of the target frequency output from the optical transmission path and generated in the optical transmission path as a result of four-wave-mixing of the optical signals of the n frequencies; and
a processor configured to
determine a power spectrum density of non-linear interference noise that occurs in the optical transmission path, by multiplying the power of the optical signal of the target frequency by an adjustment value, and
hold coefficient information indicating a relationship between a frequency and an adjustment coefficient, wherein the adjustment value is the adjustment coefficient for the target frequency indicated by the coefficient information.

2. The measurement apparatus according to claim 1, wherein a gain at the target frequency in the optical transmission path is within a predetermined range that includes an average gain value over a transmission band of the optical transmission path.

3. The measurement apparatus according to claim 1, wherein a gain at the target frequency in the optical transmission path is a largest gain value over a transmission band of the optical transmission path.

4. A measurement apparatus comprising:
a light source configured to generate optical signals of n frequencies, n is an integer of 3 or larger, from among n+1 frequencies at a predetermined frequency interval, and output the generated optical signals to an optical transmission path that is a measurement target, wherein one frequency that is different from the n frequencies out of the n+1 frequencies is a target frequency;
an optical power meter configured to measure power of an optical signal of the target frequency output from the optical transmission path and generated in the optical transmission path as a result of four-wave-mixing of the optical signals of the n frequencies; and
a processor configured to
determine a power spectrum density of non-linear interference noise that occurs in the optical transmission path, by multiplying the power of the optical signal of the target frequency by an adjustment value,
hold coefficient information indicating a relationship between a frequency and an adjustment coefficient, and
obtain a number-of-span correction value based on a number of spans of the optical transmission path, wherein the adjustment value is a value obtained by correcting the adjustment coefficient for the target frequency indicated by the coefficient information, using at least the number-of-span correction value.

5. A measurement apparatus comprising:
a light source configured to generate optical signals of n frequencies, n is an integer of 3 or larger, from among n+1 frequencies at a predetermined frequency interval, and output the generated optical signals to an optical transmission path that is a measurement target, wherein one frequency that is different from the n frequencies out of the n+1 frequencies is a target frequency;

an optical power meter configured to measure power of an optical signal of the target frequency output from the optical transmission path and generated in the optical transmission path as a result of four-wave-mixing of the optical signals of the n frequencies; and a processor configured to determine a power spectrum density of non-linear interference noise that occurs in the optical transmission path, by multiplying the power of the optical signal of the target frequency by an adjustment value, hold coefficient information indicating a relationship between a frequency and an adjustment coefficient, and obtain a span length correction value based on an average value of span lengths of the optical transmission path, wherein the adjustment value is a value obtained by correcting the adjustment coefficient for the target frequency indicated by the coefficient information, using at least the span length correction value.

6. A measurement apparatus comprising:

a light source configured to generate optical signals of n frequencies, n is an integer of 3 or larger, from among n+1 frequencies at a predetermined frequency interval, and output the generated optical signals to an optical transmission path that is a measurement target, wherein one frequency that is different from the n frequencies out of the n+1 frequencies is a target frequency;

an optical power meter configured to measure power of an optical signal of the target frequency output from the optical transmission path and generated in the optical transmission path as a result of four-wave-mixing of the optical signals of the n frequencies; and a processor configured to determine a power spectrum density of non-linear interference noise that occurs in the optical transmission path, by multiplying the power of the optical signal of the target frequency by an adjustment value, hold coefficient information indicating a relationship between a frequency and an adjustment coefficient, and obtain a wavelength dispersion correction value based on a wavelength dispersion of the optical transmission path, wherein the adjustment value is a value obtained by correcting the adjustment coefficient for the target frequency indicated by the coefficient information, using at least the wavelength dispersion correction value.

7. A measurement apparatus comprising:

a light source configured to generate optical signals of n frequencies, n is an integer of 3 or larger, from among n+1 frequencies at a predetermined frequency interval, and output the generated optical signals to an optical transmission path that is a measurement target, wherein one frequency that is different from the n frequencies out of the n+1 frequencies is a target frequency;

an optical power meter configured to measure power of an optical signal of the target frequency output from the optical transmission path and generated in the optical transmission path as a result of four-wave-mixing of the optical signals of the n frequencies; and a processor configured to determine a power spectrum density of non-linear interference noise that occurs in the optical transmission path, by multiplying the power of the optical signal of the target frequency by an adjustment value, hold coefficient information indicating a relationship between a frequency and an adjustment coefficient, and obtain a dispersion slope correction value based on a dispersion slope of the optical transmission path and dispersions or a standard deviations of dispersion slopes of spans of the optical transmission path, wherein the adjustment value is a value obtained by correcting the adjustment coefficient for the target frequency indicated by the coefficient information, using at least the dispersion slope correction value.

8. The measurement apparatus according to claim 1, wherein the processor is further configured to hold a plurality of pieces of coefficient information respectively corresponding to average values of a plurality of span lengths, and the adjustment value is the adjustment coefficient for the target frequency indicated by a piece of coefficient information selected from the plurality of pieces of coefficient information based on an average value of a span length of the optical transmission path.

9. The measurement apparatus according to claim 1, wherein the processor is further configured to hold a plurality of pieces of coefficient information respectively corresponding to a plurality of wavelength dispersions, and the adjustment value is the adjustment coefficient for the target frequency indicated by a piece of coefficient information selected from the plurality of pieces of coefficient information based on a dispersion of the optical transmission path.

10. The measurement apparatus according to claim 1, wherein the processor is further configured to hold a plurality of pieces of coefficient information respectively corresponding to combinations of a dispersion slope and a dispersion or a standard deviation of the dispersion slope, and the adjustment value is the adjustment coefficient for the target frequency indicated by a piece of coefficient information selected from the plurality of pieces of coefficient information based on a combination of a dispersion of the optical transmission path and a dispersion or a standard deviation of a dispersion slope of each span of the optical transmission path.

11. The measurement apparatus according to claim 1, wherein n is an integer of 50 or larger.

12. The measurement apparatus according to claim 1, wherein n is an integer of 100 or larger.

13. The measurement apparatus according to claim 1, wherein n is 3.

14. The measurement apparatus according to claim 13, wherein the light source is further configured to generate modulated light of a first frequency, continuous light of a second frequency, and continuous light of a third frequency, the optical power meter includes:

a first power meter configured to measure power of the modulated light that is output by the optical transmission path, a photoelectric converter configured to convert the modulated light output by the optical transmission path and the optical signal of the target frequency generated in the optical transmission path, and output a first electrical signal corresponding to the modulated light and a second electrical signal corresponding to the optical signal of the target frequency, and a second power meter configured to measure power of the first electrical signal and power of the second electrical signal, and the optical power meter is further configured to obtain the power of the optical signal of the target frequency by multiplying the power of the modulated light by a ratio of the power of the second electrical signal to the power of the first electrical signal.

15. The measurement apparatus according to claim 1, wherein the processor is further configured to determine a generalized optical signal-to-noise ratio of the optical transmission path, based on the power spectrum density of non-linear interference noise that occurs in the optical transmission path.

* * * * *